(12) United States Patent
Brunwinkel

(10) Patent No.: US 6,548,781 B1
(45) Date of Patent: Apr. 15, 2003

(54) MEANS AND METHOD FOR CONTROLLING THE INTENSITY DISTRIBUTION OF A LASER BEAM

(75) Inventor: Klaus Brunwinkel, Göttingen (DE)

(73) Assignee: Microlas Lasersystem GmbH, Goettingen (DE)

( * ) Notice: Subject to any disclaimer, the term of this patent is extended or adjusted under 35 U.S.C. 154(b) by 0 days.

(21) Appl. No.: 09/539,418

(22) Filed: Mar. 30, 2000

(30) Foreign Application Priority Data

Apr. 1, 1999 (DE) .......................... 199 15 000

(51) Int. Cl.[7] .............................. B23K 26/06
(52) U.S. Cl. .................. 219/121.73; 219/121.75
(58) Field of Search .................. 219/121.73, 121.74, 219/121.75, 121.67, 121.68, 121.69; 359/618, 619, 628; 362/259, 268

(56) References Cited

U.S. PATENT DOCUMENTS

| | | | | |
|---|---|---|---|---|
| 3,943,324 A | * | 3/1976 | Haggerty | |
| 4,822,975 A | * | 4/1989 | Torigoe | |
| 5,414,559 A | | 5/1995 | Burghardt et al. | .......... 359/623 |
| 5,517,000 A | * | 5/1996 | Nishiwaki et al. | |
| 5,607,821 A | * | 3/1997 | Haruki et al. | |
| 5,674,414 A | * | 10/1997 | Schweizer | |
| 5,676,866 A | * | 10/1997 | in den Baumen et al. | |
| 5,719,704 A | * | 2/1998 | Shiraishi et al. | |
| 5,721,416 A | | 2/1998 | Burghardt et al. | ..... 219/121.73 |
| 5,796,521 A | | 8/1998 | Kahlert et al. | .............. 359/619 |
| 5,807,379 A | * | 9/1998 | L'Esperance, Jr. | |
| 5,946,138 A | * | 8/1999 | Mizouchi | |
| 6,008,468 A | * | 12/1999 | Tanaka et al. | |
| 6,172,331 B1 | * | 1/2001 | Chen | |
| 6,184,490 B1 | * | 2/2001 | Schweizer | |
| 6,229,113 B1 | * | 5/2001 | Brown | |

FOREIGN PATENT DOCUMENTS

| | | | | |
|---|---|---|---|---|
| DE | 3829728 A1 | 3/1989 | ............ | H01S/3/10 |
| DE | 3841045 A1 | 6/1990 | ............ | H01S/3/05 |
| DE | 19619481 C1 | 11/1997 | ........... | B23K/26/06 |

* cited by examiner

Primary Examiner—Tom Dunn
Assistant Examiner—Jonathan Johnson
(74) Attorney, Agent, or Firm—Sierra Patent Group, Ltd.; Andrew V. Smith

(57) ABSTRACT

An apparatus and a method for controlling the intensity distribution of a laser beam for processing a substrate provide that the laser radiation passes a homogenizing device, subsequent to which partial beams of the laser beam superimpose one another so that a homogenization of the intensity distribution of the laser beam is achieved. By arrangement of a diaphragm at a position in the radiation path of the laser beam, radiation is cut out off the partial beams superimposing one another in such a way that varied portions of at least some of the partial beams are cut out.

24 Claims, 4 Drawing Sheets

Figure 5:
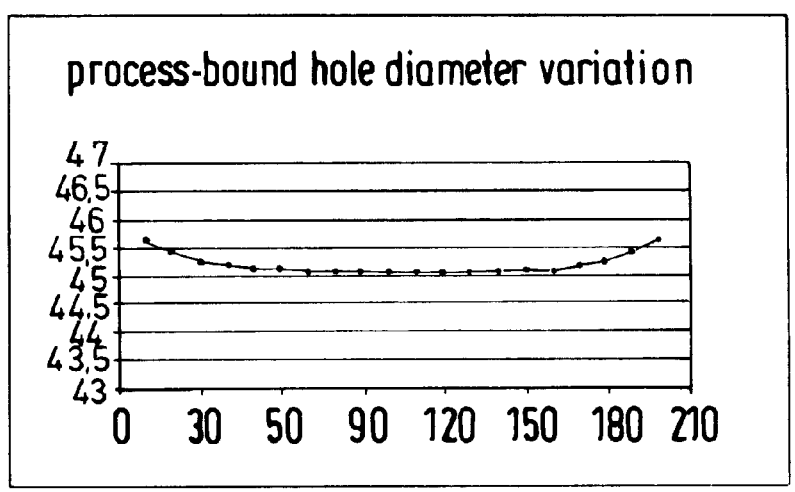

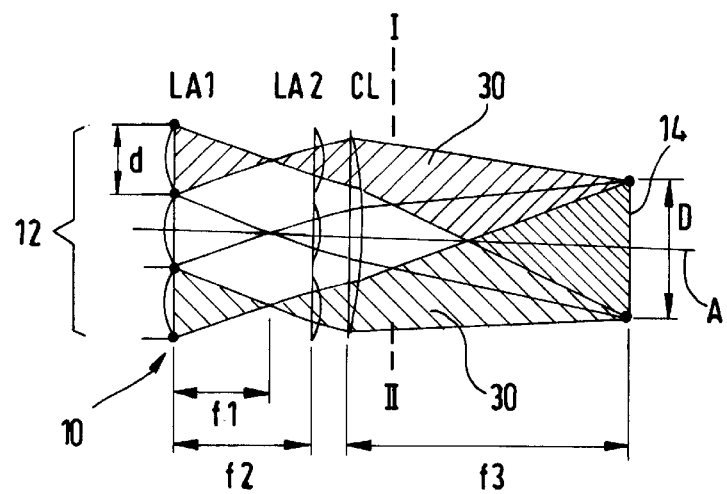
FIG.1
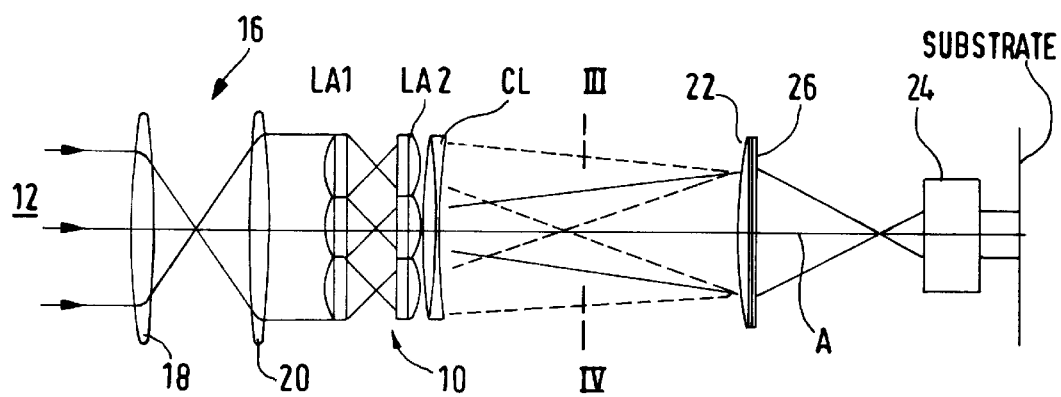
FIG.2
FIG.3
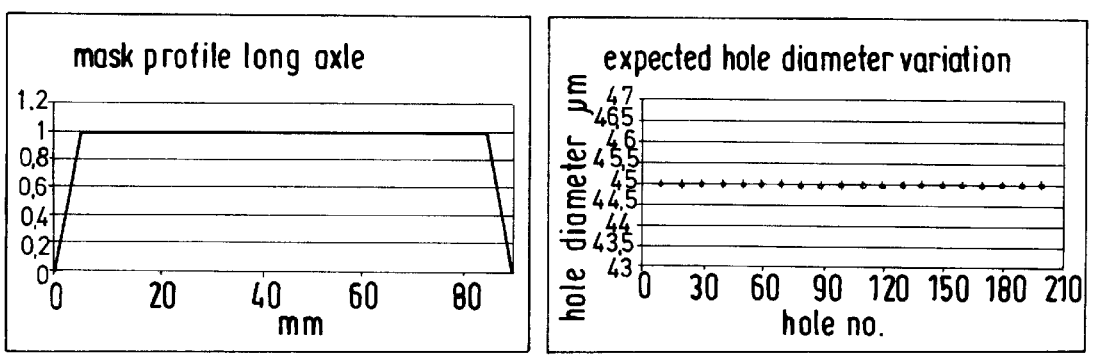
FIG.4

FIG. 7
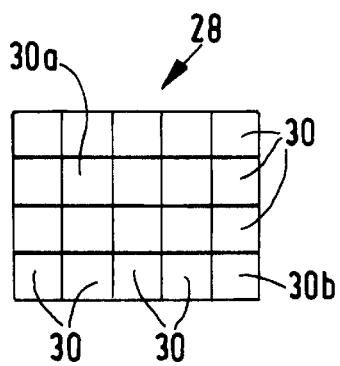
FIG. 8
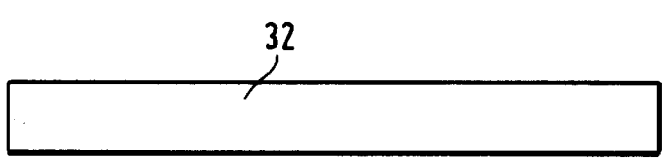
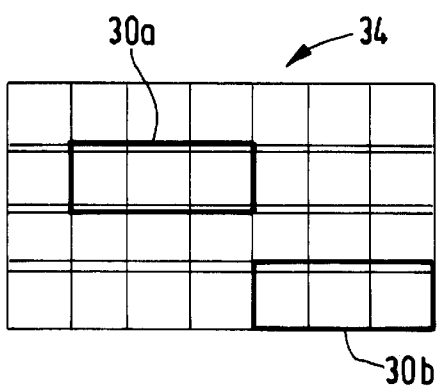
FIG. 9
FIG. 10
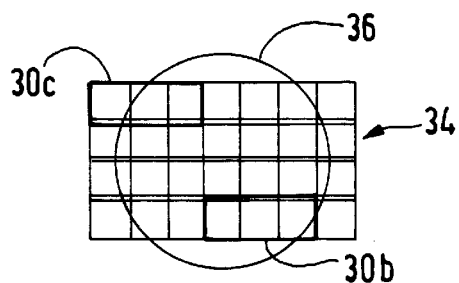
FIG. 11
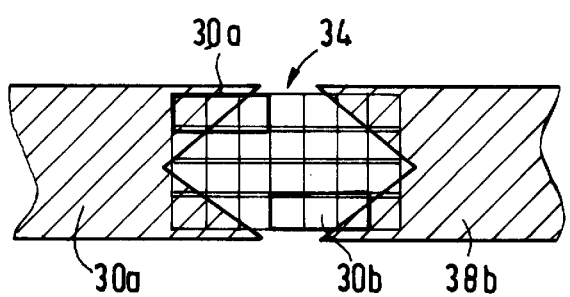

MEANS AND METHOD FOR CONTROLLING THE INTENSITY DISTRIBUTION OF A LASER BEAM

The invention relates to both, a means and a method for controlling the intensity distribution of a laser beam by means of a homogenizing device which is arranged in the radiation path of the laser beam and which superimposes partial beams of the laser beam one another such that a homogenization of the intensity distribution of the laser beam is supported.

Such a means is known from DE 42 20 705 A1. Therein, the intensity distribution of a laser beam is homogenized (spatially equalized) by means of a plurality of lenses arranged in one row perpendicular to the optical axle. These lenses are respectively formed in such a way that individual partial beams of the laser beam superimpose one another so that the laser radiation shown is altogether extensively homogenized.

A continued development of this state of the art is described in DE 196 32 460 C1. Therein, a plurality of illuminating fields each having a homogeneous intensity distribution, are generated, wherein a row of lenses shows several groups of non centric cylinder lens segments (see also U.S. Pat. No. 5,796,521).

The present invention both, requires and assumes knowledge of the afore mentioned state of the art. The patent documents mentioned above are included in the disclosure of the present application by means of reference.

By means of the homogenizing device mentioned especially the radiation of an excimer laser beam is homogenized for several applications, i.e. the intensity distribution of the laser beam is homogenized across its profile. The laser beam emitted (and not yet optically manipulated) by an excimer laser has, as a rule, no homogeneous intensity distribution across its profile. The laser beam emitted by an excimer laser has approximately a rectangular shape in dimensions of roughly 10×30 mm. In the context of the rectangular shape one speaks of a short axle (meaning e. g. 10 mm long) and of a long axle (meaning e.g. 30 mm long). For a multitude of applications this beam requires to be imaged in an optically extremely reducing fashion. In addition, many applications require also a homogenization of the beam intensity, i.e. a constant intensity distribution of the beam across its profile. Optical devices for the homogenization of laser beams are also known from DE-A-42 20 705 (corresponding to U.S. Pat. No. 5,414,559), DE-38 29 728 A1, DE-38 41 045 A1 and DE 195 20 187 A1.

During the industrial employment of laser radiation, especially excimer laser radiation, applications occur frequently, which not only require a homogenization of the laser radiation impacting on a material to be processed but, in addition, make a purposeful adjustment of the intensity distribution after homogenization desirable. A respective example is the utilization of laser radiation for the production of arrays of holes in a thin foil (e.g. polymer foil). In order to produce arrays of holes in such a foil (typically with a thickness of 20 to 100 $\mu$) the laser radiation is directed in a known fashion onto a mask into which arrays of holes are formed. The laser radiation penetrating the mask is imaged onto the substrate (here meaning the foil) by an objective with a reduction of, for example, 2,5 to 5 times. At the same time the intensity of the laser radiation increases square to the factor of the reduction, e.g. at a 5 times reduction the intensity increases 25 times.

In order to produce holes in a foil of the kind mentioned, 100 to 300 pulses of excimer laser radiation, depending on type, are required. In the state of the art laser radiation is homogenized by such means as described in the state of the art mentioned in the beginning.

Nevertheless, it occurs, for example, that during the boring of arrays of holes, as described before, the hole diameters in the respective row are not completely commensurate, especially on the exit side. It is observable that the diameter of She holes arranged on the outside of the row is wider than that of the holes positioned on the inside. This is explained by the absorption of radiation by the particles generated during the ablation process. The concentration of absorbing particles is larger in the center of the track of holes than on the outside. As a result, the outer holes of a track of holes become wider than the inner ones.

Also in other applications can such process-bound influences lead to the effective laser energy being not nearly as homogeneously distributed as originally done so very homogeneously by the homogenizing device.

The object of the invention is to provide an apparatus and a method for the control and adjustment of intensity distribution of laser radiation in a simple way.

The apparatus according to the invention to achieve this object is characterized by a diaphragm placed in the radiation path behind the homogenizing device for cutting the radiation out from the superimposed partial beams in such a way that variable portions are cut out from at least some of those partial beams that have not completely superimposed one another.

The method of control and adjustment according to the invention provides that by means of a diaphragm radiation is cut out from the laser beam in such a way, that variable portions are cut out from at least some of those partial beams that have not completely superimposed one another.

The employment of a diaphragm and a mask, respectively, in connection with a homogenizing device of the kind mentioned herein is known from DE 196 19 481 C1. There, a mask is arranged so far in the rear of the radiation path, however, that the laser beam illuminates homogeneously one aperture in the mask and this homogeneously illuminated aperture is then imaged onto a surface. Therefore, the partial beams are already completely superimposed by one another at the location of the mask and respective equal portions of them are cut out.

The invention relates further to the application of a means and a method for the generation of structures in substrates, especially for the production of arrays of holes with a constant diameter.

A preferred embodiment of the means according to the invention provides that the diaphragm is arranged concentrically with the laser beam. This means that the center of the effective area of the diaphragm coincides at least closely with the axis of the laser beam.

An advantageous embodiment of the invention provides that the diaphragm is adjustable, i.e. the effective area in which the diaphragm cuts radiation out from the laser beam can be altered manually as well as automatically.

Suitable for the invention are apertured diaphragms as well as diaphragms which cut radiation out from the central area of the laser beam and let peripheral beams pass.

Especially suitable are round shaped and more especially circular or oval diaphragms. Angular diaphragms, especially rectangular ones as well as square ones are also suitable.

For the homogenizing-device used in the invention arrays of cylindrical lenses with one convex lens are particularly considered, as described accordingly in the state of the art mentioned at the beginning.

The invention is especially suitable for the homogenization and control of the intensity distribution of an excimer laser beam.

Figure 6:
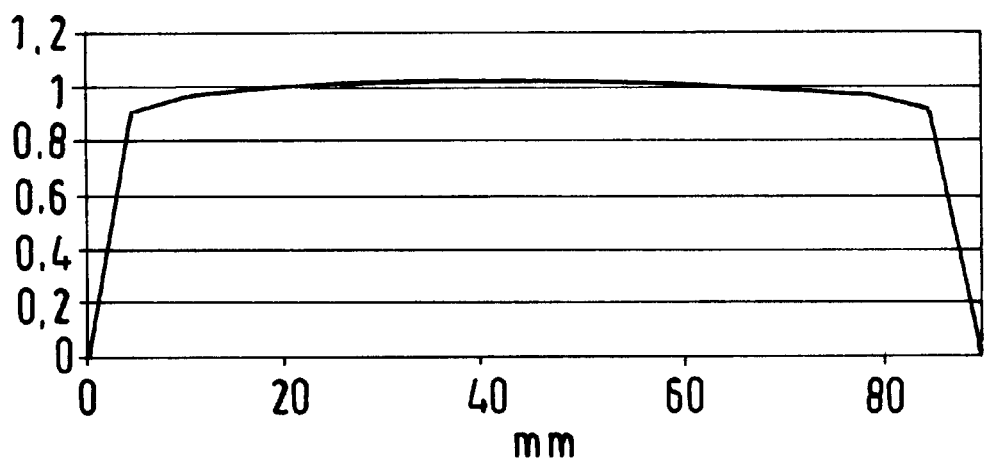

Hereinafter, examples of embodiments of the invention are described in more detail with reference to the drawings. Shown is in:

FIG. 1 schematically a homogenizing device preferably used in a means for controlling the intensity distribution of a laser beam according to the invention;

FIG. 2 schematically a homogenizing device and further optical elements, including a mask which is also usable in a means for controlling the intensity distribution of a laser beam according to the invention;

FIG. 3 a typically homogeneous intensity distribution of a excimer laser beam as achievable with devices according to the FIGS. 1 and 2;

FIG. 4 a variation of hole diameters expectable when boring an array of holes by means of laser radiation having a homogeneous intensity distribution;

FIG. 5 an actually occurring diameter variation of holes drilled with laser radiation;

FIG. 6 schematically a desired intensity distribution of a laser beam for the generation of constant hole diameters;

FIG. 7 schematically an arrangement of partial beams of a laser beam immediately behind a convex lens of the homogenizing device;

FIG. 8 a single partial beam of the laser radiation as imaged on the desired plane, e.g. the plane of a mask;

FIG. 9 a section vertical to the axle of the laser radiation at a distance to the convex lens comparably greater than shown in FIG. 7, whereat individual partial beams are already partially expanded and, therefore, overlap one another;

FIG. 10 schematically a diaphragm placed in the; laser beam at a position where partial beams of the laser beam do not yet overlap one another completely due to the effect of the homogenizing device;

FIG. 11 a modified embodiment of a diaphragm, and

Figure 12:
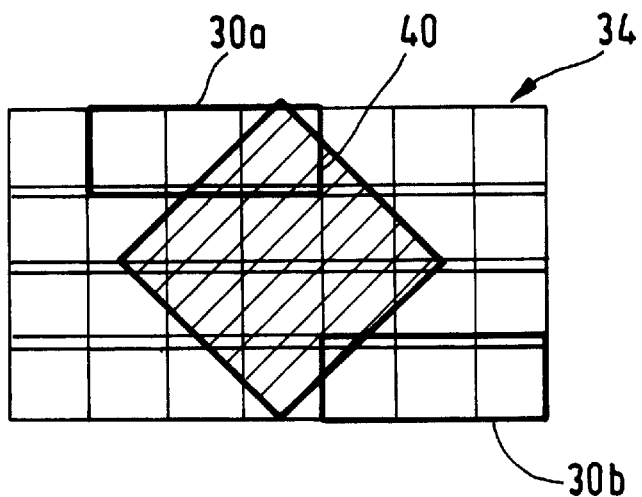
Figure 13:
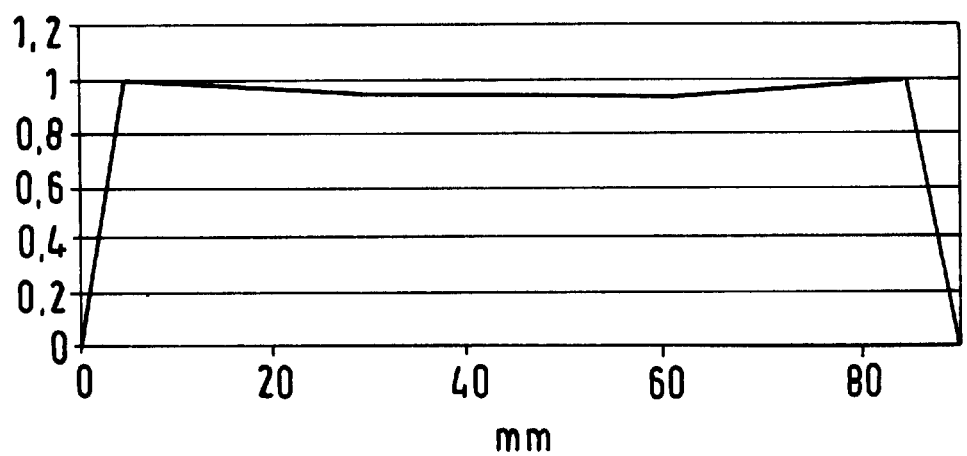

FIGS. 12 and 13 a further embodiment of a diaphragm which cuts out radiation centricly in the laser beam (FIG. 12) as well as the intensity distribution in the laser.beam achieved with that (FIG. 13).

FIG. 1 shows a homogenizing device 10 capable of homogenizing a laser beam 12, e.g. an excimer laser beam.

The homogenizing device 10 comprises two parallel arranged rows ("arrays") of cylindrical lenses LA1 and LA2. The longitudinal axes of the cylindrical lenses stand perpendicular to the drawing plane. This is also shown in the schematic depiction of the shapes of the cylindrical lenses in the figures. When using an excimer laser beam the cylinder axes stand, therefore, parallel to the "long axis" of the laser beam mentioned above. In the figures the radiation path of the laser beam 12 runs from left to right. A convex lens (condenser lens) CL is arranged in the radiation path behind the arrays of cylindrical lenses LA1 and LA2. Insofar, the homogenizing device is known from the state of the art mentioned at the beginning.

By the first array of cylindrical lenses LA1 the incident laser beam is partitioned into a plurality of partial beams. In FIG. 1 only three partial beams are depicted, with their diameter being marked "d" in FIG. 1. Usually a multitude of partial beams are used, typical are 5 to 20 partial beams.

The optical elements LA1, LA2 and CL cause that the laser radiation 12 incident from the left in FIG. 1 is imaged on a plane 14. There, the imaged radiation has a diameter "D" in the direction interesting here, i.e. the drawing plane. The central axis of the laser radiation is marked "A".

The optical elements and especially the condenser lens CL induce that all partial beams superimpose (overlap) one another completely on plane 14. This means that any non-uniformities of the intensities still existing in the incident laser beam 12 are completely leveled, i.e. the laser beam imaged on the plane 14 is homogenized.

In case the incident laser radiation is non-homogeneous also in the direction perpendicular to the drawing plane, a second homogenizing device (not shown), turned by 90° compared to the depiction in FIG. 1, becomes necessary.

The respective focus-distances are f1 for the array of cylindrical lenses LA1, f2 for the array of cylindrical lenses LA2 and f3 for the condenser lens CL. Size and shape of the illuminated field on the imaging plane 14 (square, rectangular or line) is determined by the width and the focus f2 of the cylindrical lenses of array LA2 as well as the focus f3 of the condenser lens CL In the following, the explanation deals with the so-called long axis (see above) of an elongated section (line) in the dimensions of, e.g., 80×3 mm. For the width D of this section (therefore, the line thickness) D=(f3/f2)d applies. With this field, imaged on plane 14, a mask, for example, is illuminated. This is shown in more detail in FIG. 2.

FIG. 2 shows a homogenizing device 10 according to FIG. 1, whereat further optical elements are added, being for one a telescope 16 in the incident laser beam 12, further a field lens 22 placed immediately in front of a mask 26 as well as imaging optics 24 for imaging the radiation onto a substrate to be processed.

The following is an explanation of the invention with respect to a typical application, being the generation of holes in a foil of the kind mentioned at the beginning, e.g. a polymer foil with a typical thickness of 20 to 100 $\mu$m. At the same time it applies that the diameter of the hole drilled by laser radiation is all the wider the more intense the laser radiation is.

FIG. 3 shows the homogeneous field of the laser radiation across the beam, wherein the radiation is homogenized by means of a homogenizing device according to FIG. 2. FIG. 3 depicts on the abscissa the location in the cross section of the beam (e.g., in the FIGS. 1 and 2 the distance of the location from the beam's border on the paper plane) and on the ordinate the radiation intensity in arbitrary units. According to FIG. 3 the intensity distribution achieved is extensively homogeneous apart from very narrow flanks in which the intensity rises from zero to the terminal value.

When boring through a foil (substrate) arranged in the plane 14 by means of homogenized radiation, a mask 26 with formed holes as well as an imaging optics 24, one would theoretically expect a variation of hole diameters according to FIG. 4, i.e. a completely constant hole diameter of 45 $\mu$m with respect to the embodiment.

However, the actually resulting variation of hole diameters is according to FIG. 5, i.e. the outer holes have a wider diameter than the inner ones. This results from the outer holes being drilled with a greater laser beam intensity than the inner holes. As the reason for this it is assumed that during the hole boring process the ablation products are concentrated more around the central holes, causing the laser radiation to be absorbed stronger here, than in the area of the outer holes.

Therefore, it is necessary to adjust the intensity distribution so that all holes have the same diameter. FIG. 6 shows an appropriate intensity distribution for a laser radiation capable of achieving the ideal variation of hole diameters according to FIG. 4 instead of the variation of hole diameters according to FIG. 5.

The figures described hereinafter depict schematically how this is achieved. FIG. 7 shows an arrangement of a plurality of partial beams 28 occurring, for example, at the cross-section I–II of FIG. 1. At this spot of the radiation, i.e. shortly behind the condenser lens CL, the individual partial beams (with a diameter d according to FIG. 1) are still separate from one another, i.e. they superimpose (overlap) one another not yet. The depiction according to FIG. 7 is based on an arrangement of two homogenizing devices according to FIG. 1, wherein each homogenizing device is comprised of two arrays of cylindrical lenses arranged vertically to one another, each array showing five vertical and four horizontal cylindrical lenses. Therefore, the cylindrical lenses stand vertical to one another in pairs, i.e. a homogenization is achieved in both axes of the laser beam, namely in the drawing plane according to the FIGS. 1 and 2 as well as perpendicular thereto.

With such an arrangement 20 (twenty) square illumination fields are produced which correspond to 20 partial beams 30. In the imaging plane, which coincides in essence with the plane of the mask 26 in an arrangement according to FIG. 2, each individual partial beam 30 is transformed from a square shape, as shown in FIG. 7, into an elongated shape 32, as shown in FIG. 8, i.e. the cylindrical lenses lead to a stretching of each individual partial beam 30 into the oblong shape 32 shown in FIG. 8. This means that all 20 fields of the partial beams 30 shown in FIG. 7 overlap one another completely and in fact according to the shape 32 of the partial beam shown in FIG. 8.

The growing overlapping, growing as the distance from the condenser lens CL increases, recognizable in FIG. 1 by the hatching, is schematically shown in FIG. 9, wherein two partial beams 30a and 30, as shown in FIG. 7, are picked out as examples. The cylindrical lenses of the kind described act so that each horizontal (i.e. in the figures the direction "from left to right") partial beam is extremely expanded, while the expansion of each partial beam running perpendicular (i.e. in the figures the direction "from top to bottom") thereto is much smaller. FIG. 9 shows the expansion of the partial beams, the partial beams 30a and 30b being boxed in bold. FIG. 9 corresponds approximately with position III–IV of FIG. 2, i.e. a section vertical to the axle A of the optical system. The two partial beams 30a, 30b have, therefore, largely expanded horizontally and little so vertically. Consequently, the overlap is greater in the horizontal direction than in the vertical one (the terms "horizontal" and "vertical" herein relate by no means to the earth's surface but relate only to the relative directions of the system, otherwise these directions can be selected widely arbitrarily).

When a diaphragm 36 is inserted in the partially overlapping partial beams 34 in accordance with FIG. 10, varied portions of radiation are cut out from the different partial beams, which are partially expanded and overlap one another (not yet completely though). The diaphragm 36 in the embodiment according to FIG. 10 is an apertured diaphragm, i.e. all of that radiation, which lies within the depicted circle, is allowed to pass through. For the exemplary shown partial beam 30c (which is similar to the partial beam 30a, but shifted upwards by one row) this results, for example, in having approximately half of the radiation cut out while only a minimal radiant portion is cut out from the partial beam 30b. In this embodiment of the invention radiation is cut off in the outer sphere of the partial beams in such a fashion that varied portions are cut out from at least several partial beams. This does not lead to an alteration of the dimensions of the laser beam shown in the working plane (e.g. plane 14 in FIG. 1 or the mask plane 26 in FIG. 2), but only to an alteration of the intensity distribution within the laser beam, the dimensions of which remain unchanged otherwise. The arrangement of a diaphragm 36 according to FIG. 10 results in an increased intensity of the laser beam in the central sphere and a decreased intensity near the periphery, therefore, an intensity distribution approximately according to FIG. 6 is achieved.

An alteration of the size of the aperture of the diaphragm 36 causes also an alteration of the intensity distribution of the laser beam imaged on the substrate plane. The complete opening of the diaphragm 36, i.e. when no radiation is cut out, results in a completely homogeneous intensity distribution in accordance with FIG. 3. When the aperture of the diaphragm 36 is subsequently slowly reduced so that it cuts out portions of the radiation more and more, the intensity on the borders slowly decreases (FIG. 6). When reducing the diaphragm aperture further, the effect becomes constantly stronger until the intensity of the laser beam diminishes in the center, too. If the diaphragm aperture is reduced even further, then only the entire intensity continues to sink without altering the relation between the intensities from the inside to the outside. Therefore, the meaningful area of adjustment for the diaphragm lies between fully open and the afore mentioned position, in which the radiant intensity starts to diminish also in the central area.

FIG. 11 shows a modified diaphragm, which is not circular here but angular by means of two partial diaphragms 38a and 38b, both fit for insertion into the radiation path from the left and right, respectively. Otherwise the relations conform mostly to those of FIG. 10, i.e. the alteration of the intensity distribution is analogous to the above mentioned details depending on the positioning of the two partial diaphragms 38a, 38b.

By the intensity distribution, as schematically depicted in FIG. 6, the undesired variation of the hole diameter is rectifiable during the production of an array of holes according to FIG. 5 to the effect that an ideal constant hole diameter according to FIG. 4 is achieved.

For example, with diaphragms according to the FIGS. 10 and 11 a reduction of the intensity of the laser radiation in the peripheral areas of the beam by up to 80% is achievable, without influencing the radiation intensity in the center of the beam.

The invention can be realized not only with apertured diaphragms but also with diaphragms which cut out portions of the radiation in the central area of the laser beam. This is shown in the FIGS. 12 and 13.

According to FIG. 12 a diaphragm 40 is arranged centrally in the field 34 of partially superimposed partial beams (the depiction complies analogously to the FIGS. 7.and 8). The diaphragm 40 is, therefore, not an apertured diaphragm but a centricly arranged diaphragm, which cuts out central portions of the beam and lets peripheral areas of the beam pass. The effect of such a diaphragm 40 on the individual partial beams is schematically depicted in FIG. 12 with the-partial beams 30a, 30b, i.e. the diaphragm 40 cuts out less radiation from an outwardly positioned partial beam 30b than from a more inwardly positioned partial beam 30a (here, too, both partial beams 30a, 30b are shown as bold lines and, analogous to FIG. 10, the diaphragm 40 is arranged approximately at the. position III–IV of FIG. 2). Thus, the resulting intensity distribution is in accordance with the schematic depiction in FIG. 13. The radiation intensity in the peripheral area is higher than in the center. This may be desired for particular applications of the laser radiation and is simply achieved by means of the diaphragm.

What is claimed is:

1. Apparatus for controlling the intensity distribution of a laser beam incident upon a mask, comprising:

a homogenizing device which is arranged in the radiation path of the laser beam, partitions the laser beam into a plurality of partial beams and superimposes the partial beams of the laser beam in such a way that homogenization of the intensity distribution of the laser beam is supported; and a diaphragm arranged in the radiation path of the laser beam between the homogenization device and the mask, the diaphragm for cutting radiation out of the partial beams in such a way that varied portions are cut out of at least some of those partial beams outside of a plane of superposition of the partial beams.

2. Apparatus according to claim 1, wherein the diaphragm is arranged concentrically with the laser beam.

3. Apparatus according to claim 1, wherein the diaphragm is adjustable with respect to at least one of the group consisting of its relative position towards the laser beam and its size.

4. Apparatus according to claim 1, the diaphragm is an apertured diaphragm.

5. Apparatus according to claim 2, the diaphragm is an apertured diaphragm.

6. Apparatus according to claim 3, the diaphragm is an apertured diaphragm.

7. Apparatus according to claim 1, wherein the diaphragm is arranged in such a way that it cuts out in the central area of the laser beam and lets peripheral beams pass.

8. Apparatus according to claim 1, wherein the shape of the diaphragm is selected from the group consisting of round, circular, and oval.

9. Apparatus according to claim 1, wherein the shape of the diaphragm is selected from the group consisting of angular, rectangular and square.

10. Apparatus according to claim 1, wherein the homogenizing device comprises arrays of cylindrical lenses and a condenser lens.

11. Apparatus according to claim 1, wherein the laser beam is an excimer laser beam.

12. Apparatus according to claim 1, wherein the diaphragm is arranged in the radiation path of the laser beam behind the homogenizing device.

13. Method for controlling the intensity distribution of a laser beam incident upon a mask by means of a homogenizing device which is arranged in the radiation path of the laser beam such that it superimposes partial beams of the laser beam and, thereby, supports a homogenization of the intensity distribution of the laser beam, comprising the steps of:

partitioning the laser beam into a plurality of partial beams at the homogenization device; and blocking radiation from the laser beam by means of a diaphragm between the homogenization device and the mask in such a way that varied portions are cut out of at least some of those partial beams outside of a plane of superposition of the partial beams.

14. Method for generating ablatations in a substrate, said method comprising the use of an apparatus according to claims 1 to 12.

15. Method according to claim 14, wherein said ablatations are holes in the substrate.

16. Apparatus according to claim 1, further comprising a mask disposed in the radiation path of the laser beam after the diaphragm.

17. Apparatus for controlling the intensity distribution of a laser beam by means of a homogenizing device, which is arranged in the radiation path of the laser beam, partitions the laser beam into a plurality of partial beams and superimposes the partial beams of the laser beam in such a way that homogenization of the intensity distribution of the laser beam is supported comprising:

a diaphragm arranged in the radiation path of the laser beam after the homogenization device for cutting radiation our of the partial beams in such a way that varied portions are cut out of at least some of those partial beams outside of a plane of superposition of the partial beams; and a mask disposed in the radiation path of the laser beam after the diaphragm.

18. Apparatus according to claim 17, wherein the diaphragm is arranged concentrically with the laser beam.

19. Apparatus according to claim 17, wherein the diaphragm is adjustable with respect to its relative position towards the laser beam and/or its size.

20. Apparatus according to claim 17, the diaphragm is an apertured diaphragm.

21. Apparatus according to claim 17, wherein the diaphragm is arranged in such a way that it cuts out in the central area of the laser beam and lets peripheral beams pass.

22. Apparatus according to claim 17, wherein the diaphragm is shaped round, especially circular, or oval.

23. Apparatus according to claim 17, wherein the diaphragm is shaped angular, especially rectangular and even more especially square.

24. Apparatus according to claim 17, wherein the laser beam is an excimer laser beam.

* * * * *